United States Patent [19]

Quam

[11] Patent Number: 5,769,560
[45] Date of Patent: Jun. 23, 1998

[54] PORTABLE STAGE MODULE FASTENING DEVICE

[75] Inventor: Grant S. Quam, Owatonna, Minn.

[73] Assignee: Wenger Corporation, Owatonna, Minn.

[21] Appl. No.: 689,319

[22] Filed: Aug. 7, 1996

[51] Int. Cl.$^6$ ........................................................ F16B 2/22
[52] U.S. Cl. ........................ 403/325; 403/321; 403/397; 24/625; 108/64; 108/65; 52/582.2
[58] Field of Search .................................... 403/321, 325, 403/329, 338, 397, 384, 396, 322; 24/625, 626; 108/65, 64; 52/582.2

[56] References Cited

U.S. PATENT DOCUMENTS

| | | | |
|---|---|---|---|
| 2,246,750 | 6/1941 | Murphy | 403/313 X |
| 2,267,558 | 12/1941 | Fernberg | 24/625 X |
| 2,521,354 | 9/1950 | Flora | 24/625 X |
| 2,809,413 | 10/1957 | Wootton | 24/625 X |
| 2,848,289 | 8/1958 | Page | 108/64 X |
| 4,178,651 | 12/1979 | Mayer | 403/325 X |
| 4,245,377 | 1/1981 | Soltes | 24/625 |
| 4,309,120 | 1/1982 | Werthmann | 403/397 X |
| 4,544,119 | 10/1985 | Kellett et al. | 24/625 X |
| 5,144,888 | 9/1992 | Heine et al. | 108/64 |

*Primary Examiner*—Harry C. Kim
*Attorney, Agent, or Firm*—Patterson & Keough, P.A.

[57] ABSTRACT

A clamp assembly for detachably joining two adjacent portable stage modules. The clamp assembly is attached to the underside of one of the modules. When not in use, a spring biases the clamp away from the attachment bracket. The clamp includes two resilient, outwardly curving wing elements. Each wing element has a pair of opposing locking slots or engaging surfaces. A variable distance from a midpoint of a line segment between the two forward locking slots to the rear locking slots is the operational criterion for detachably joining two stage modules. When the wing elements are inwardly biased toward each other, thereby assuming a tension position, the distance between the midpoint and the rear locking slots is greater than when the wing elements are in a relaxed position. Thus, when in a tension position, the locking slots of the wing elements may be positioned such that an opposing flanges on each module will become firmly lodged within the locking slots when the wing elements are allowed to return to a relaxed position. During disassembly, the wing elements are again biased toward each other, then rotated away from the module lips, thereby detaching the modules.

15 Claims, 5 Drawing Sheets

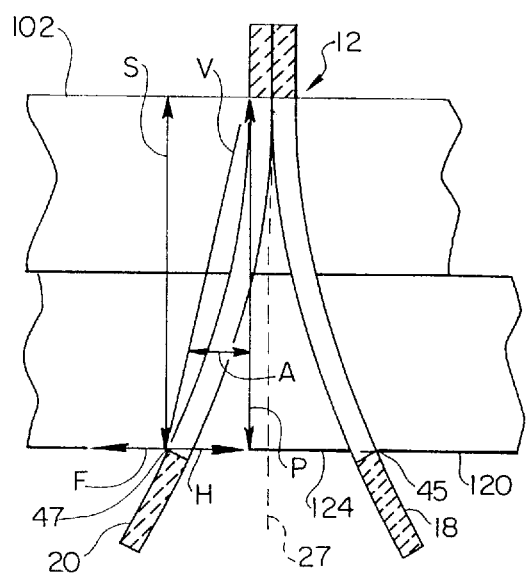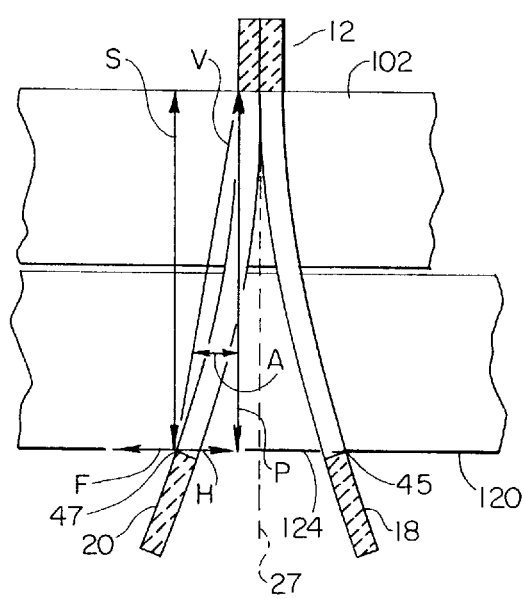

PORTABLE STAGE MODULE FASTENING DEVICE

FIELD OF THE INVENTION

The present invention relates to attachment devices. More specifically, it relates to a unique, self-biasing clamp assembly for holding two adjacent objects in abutting relationship. The invention is particularly useful for quickly and easily assembling and disassembling portable stage modules.

BACKGROUND OF THE INVENTION

Portable stages for performances and the like are well known. Such stages are often made up from individual stage platform modules that can be transported to the site of the stage, and raised to a desired height, usually by securing the modules on adjustable legs. Adjacent stage platform modules are then joined together to provide a continuous stage floor. The platform modules must be securely joined together to provide a stage that is safe to use for performances. The ease and speed with which the stage can be assembled and disassembled is largely determined by the mechanisms used to securely join adjacent modules.

The elevated floor disclosed in U.S. Pat. No. 4,930,277, assigned to the assignee of the present invention, utilizes various clamps secured by nuts and bolts to join adjacent panels in a secure, tight fit. These separate clamps, nuts and bolts, as well as the hand tools necessary for assembly and disassembly, must be transported with the floor modules. Assembly and disassembly of the elevated floor is time consuming, and, while it is well suited for permanent or semipermanent installations, the elevated floor disclosed in the '277 patent is not well suited for portability.

U.S. Pat. No. 5,205,087, also assigned to the assignee of the present invention, discloses elevated staging that is well suited to portability. A connector key is used to engage and join adjacent modules. While affording a quick and secure method of attachment without the need to use nuts, bolts and hand tools, the connector key is itself a separate piece apart from the stage floor modules. As such, the connector key may be easily misplaced during disassembly or transport or it can be inconveniently located when the stage unit is being assembled, delaying or preventing timely assembly. Moreover, while the connector key arrangement securely connects adjacent stage modules, the tightness of the connection is a function of the connector key and connector key receiving channel tolerances. Thus, there is a need for a device to enable adjacent stage modules to be securely fastened together in a tight abutting fit, without the use of hand tools and separate fastening devices.

SUMMARY OF THE INVENTION

The problems outlined above are in large measure solved by the fastening device in accordance with the present invention. The fastening device hereof is a clamp assembly that includes a one piece, self-biasing clamp that can securely connect two adjacent objects in a tight, abutting relationship. The clamp can be pivotally received by a mounting bracket that may be fixedly attached to one of two adjacent objects, for pivotal shifting between a stored position and a clamping position.

The clamp in accordance with the present invention broadly includes first and second wing elements. Each wing element is generally arcuate and resilient, presenting an inner convex surface and an outwardly facing concave surface. The first and second resilient wing elements are connected at their first ends to form a clamp apex, and flare outwardly from each other at their second ends. Object engaging surfaces are included at the first and second ends of each of the wing elements. The second ends include hand graspable tabs. The opposed second ends of the first and second wing elements can be squeezed towards each other to increase the distance between the engagement surfaces and position the clamp for connecting a pair of adjacent objects. When the tabs are released, the adjacent objects are held in a tight abutting fit by the resilient wing elements. The clamp can be pivotally carried by a standoff mounting assembly that can be mounted on one of the two adjacent objects.

BRIEF DESCRIPTION OF THE DRAWINGS

FIG. 8 is a simplified bottom plan view of the subject of FIG. 7, with parts omitted for clarity and depicting force vectors applied to the clamp of the present invention when two portable stage modules are joined; and FIG. 9 is a view similar to that of FIG. 8, showing parts displaced and depicting force vectors applied thereto.

DETAILED DESCRIPTION OF THE DRAWINGS

Figure 1:
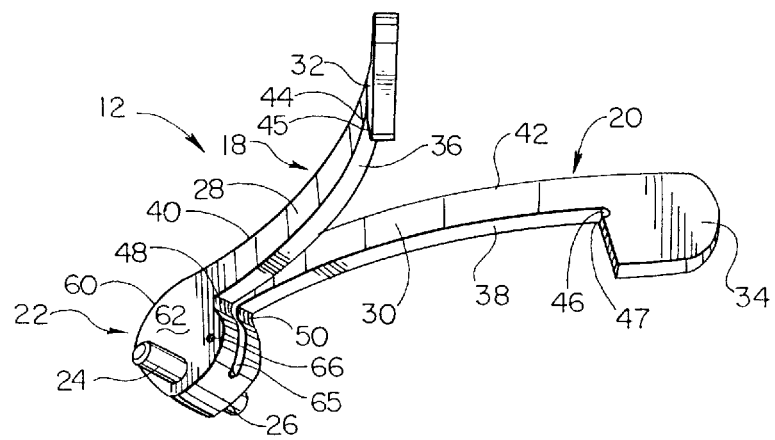
FIG. 1 is a perspective view of a fastening device clamp in accordance with the present invention.

Referring to the drawings, clamp assembly 10 in accordance with the present invention broadly includes clamp 12, standoff mounting bracket 14 and spring 16.

Clamp 12 includes two resilient wing or clamp elements 18, 20, base 22 and long and short pivot arms 24, 26. Wing elements 18, 20 are integral with base 22 and are oppositely disposed about longitudinal axis 27 of clamp 12. Long pivot arm 24 and short pivot arm 26 extend generally perpendicularly from the exterior surface of base 22.

Figure 7:
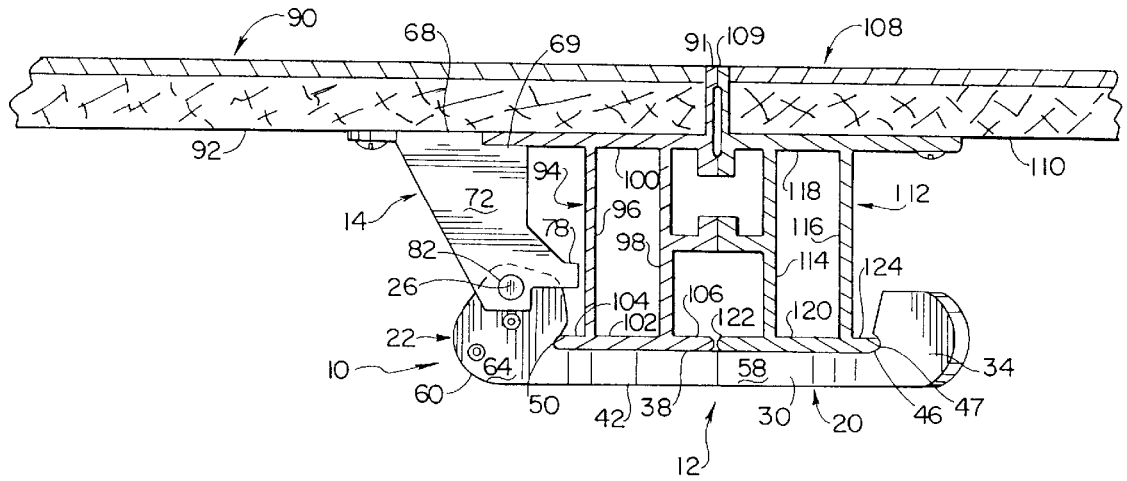
FIG. 7 is similar to FIG. 6, but with the clamp in the locked position.

Wing elements 18, 20 consist of narrowed portions 28, 30, which extend from base 22 and which terminate in widened tabs 32, 34, respectively. The upper lengths of narrowed portions 28, 30 define upper surfaces 36, 38 as viewed when clamp 12 is in use and engaging the adjacent platforms, as depicted in FIG. 7. Each upper surface 36, 38 extends from where narrowed portions 28, 30 of wing elements 18, 20 integrally join base 22 to where tabs 32, 34 begin. Opposite upper surface 36, 38 on wing elements 18, 20 are lower surfaces 40, 42, which define a continuous surface beginning at lower base surface 60 and extending to the lower surfaces of tabs 32, 34. Tabs 32, 34, with rounded tips, are widened terminal portions of wing elements 18 and 20. The junctions of the upper surfaces 36, 38 and tabs 32, 34 define front locking slots 44, 46, which are oval or elliptical recesses within tabs 32, 34. The lower edges of front locking slots 44, 46 are continuous to upper surfaces 36, 38. Contact sites 45, 47 are disposed on the exterior peripheries of the forward edges of front locking slots 44, 46.

Rear locking slots 48, 50 are formed by the junction of wing elements 18, 20 with base 22. Opposite front locking slots 44, 46 and also with surfaces continuous to upper surfaces 36, 38, rear locking slots 48, 50 are generally V-shaped with a rounded or square apex. Front and rear locking slot pairs 44, 48 and 46, 50 represent pairs of opposing locking slots or engaging surfaces, each slot having one edge continuous with upper surfaces 36, 38 on wing elements 18, 20, respectively.

Each wing element 18, 20 is curved out and away from the other wing element. This outward or convex curvature presents facing inner convex surfaces 52, 54 respectively, on wing elements 18, 20. Oppositely disposed to inner convex surfaces 52, 54 are outer concave surfaces 56, 58 on wing elements 18 and 20, respectively. Each wing element 18, 20 is integrally joined to base 22 such that convex surfaces 52, 54 are either in close proximity or in contact where wing elements 18, 20 join base 22.

Figure 2:
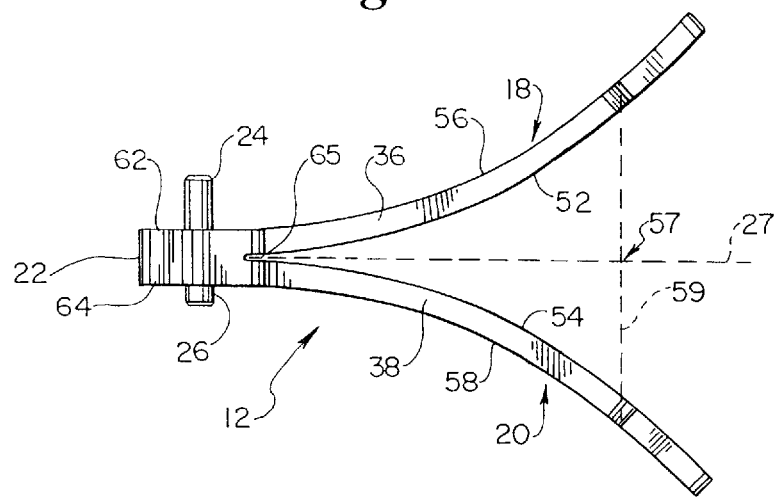
FIG. 2 is a top plan view thereof.

When clamp 12 is in a relaxed position, wing elements 18, 20 are curved outwardly as described above. In this relaxed position midpoint 57 of line segment 59 passing through front locking slots 44, 46 (see FIG. 2) is a shorter distance from rear locking slots 48, 50 than when wing elements 18, 20 are biased inwardly and proximate each other in a tension position as will be discussed below.

Figure 3:
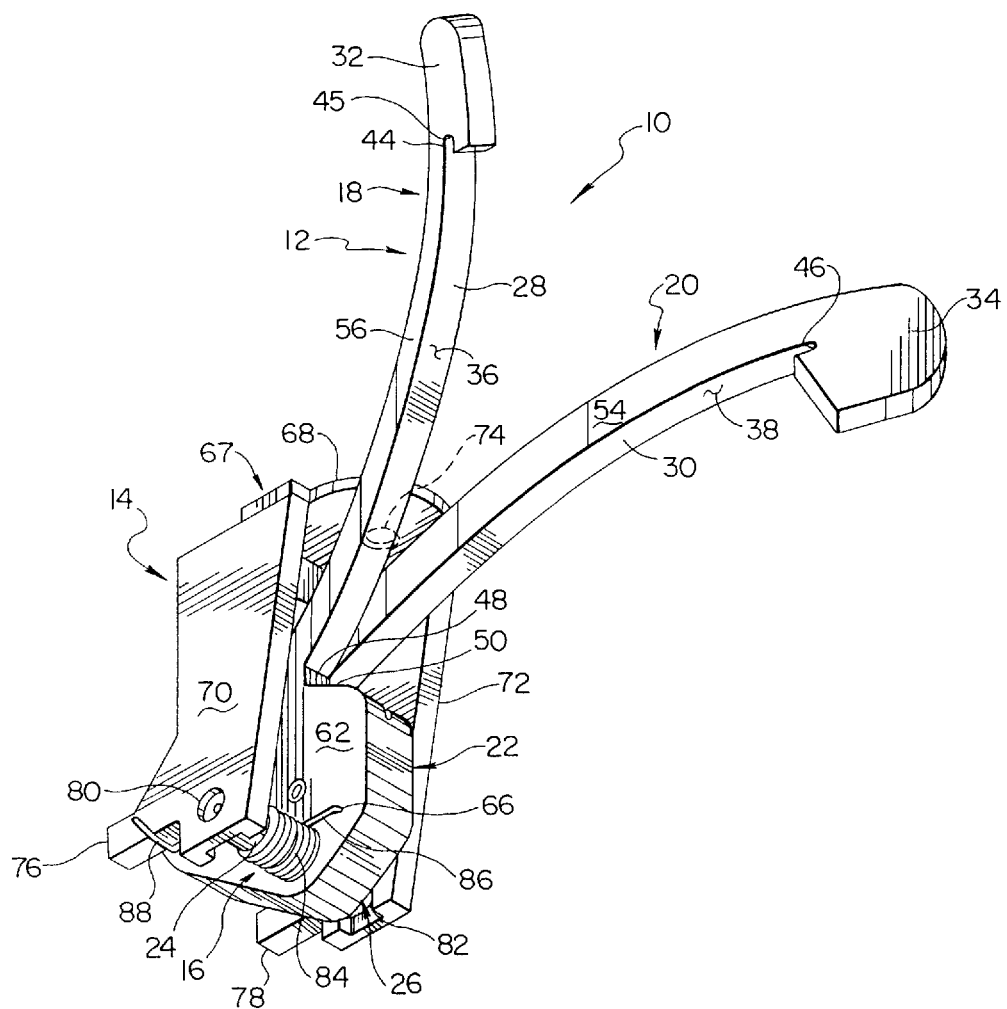
FIG. 3 is a perspective view of the clamp of FIGS. 1 and 2, pivotally carried by a mounting assembly.

Wing elements 18, 20 are integrally joined to base 22. When viewed from the side, base 22 is generally oval in shape, with a lower peripheral edge 60 continuous with lower surfaces 40, 42 of wing elements 18, 20, respectively. Base 22 has two exterior facial surfaces 62, 64, from which coaxial, long and short pivot arms 24, 26 extend generally perpendicularly and which are continuous with outer concave surfaces 56, 58. Gap 65 may divide a portion of base 22 and wing elements 18, 20. Orifice 66 is present on exterior surface 62 a short distance below and forward of long pivot arm 24 as shown in FIG. 3. Though depicted as a unitary piece to which wing elements 18 and 20 are integrally joined, base 22 also may be formed from two halves, each half integral to a wing element and each half joined to the other by rivets, screws or glue.

Figure 4:
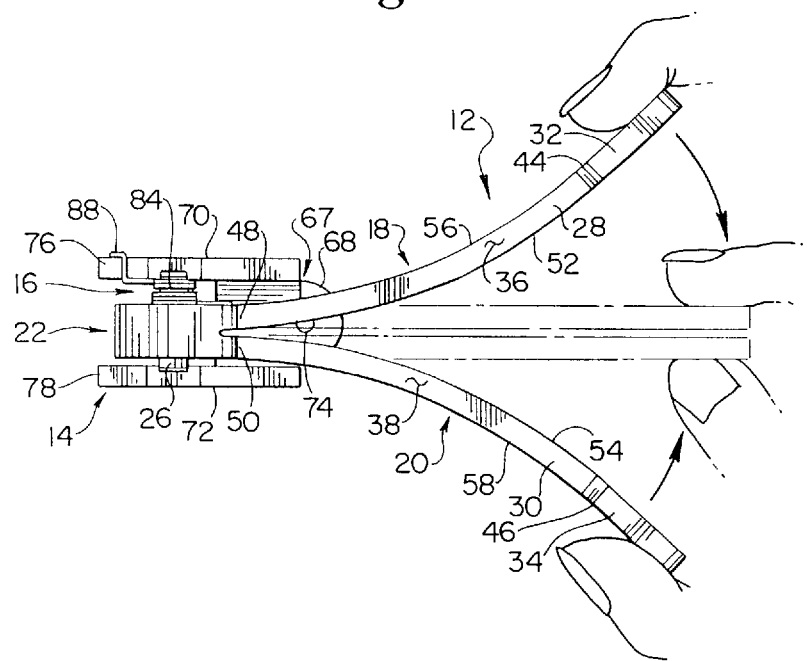
FIG. 4 is a top plan view of the clamp grasped by the fingers of a user and with phantom lines depicting the tension position of the clamp.
Figure 5:
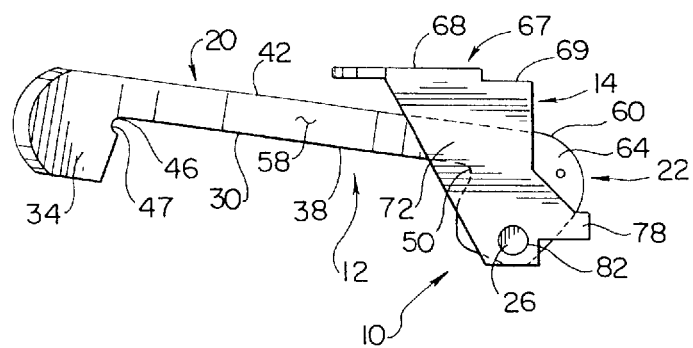
FIG. 5 is a left side elevational view of the clamp assembly.

Referring to FIGS. 3–5, standoff bracket assembly 14 includes top plate 67 preferably integral to two side plates 70, 72. Top plate 67 is preferably stepped and includes upper step 68 and lower step 69. Upper step 68 has a rounded edge where it extends beyond side plates 70, 72. Tabs 76, 78 extend from the lower rear portions of side plates 70, 72, respectively. Also situated within the lower portions of side plates 70, 72, forward to and below tabs 76, 78, respectively, are coaxial bores 80, 82. Coaxial bores 80, 82 accommodate long and short pivot arms 24, 26 of clamp 12.

Spring 16 is carried by long pivot arm 24. Spring 16 includes a spring coil portion 84 and two anchors 86, 88. Anchor 86 is a linear extension of spring coil portion 84 with a terminal bend. The portion of anchor 86 beyond the terminal bend is received within orifice 66. Anchor 88 is also a linear extension of spring coil portion 84. Anchor 88 has a plurality of bends allowing it to closely follow the bottom contour of bracket 76 when spring portion 84 is under torsional tension.

Figure 6:
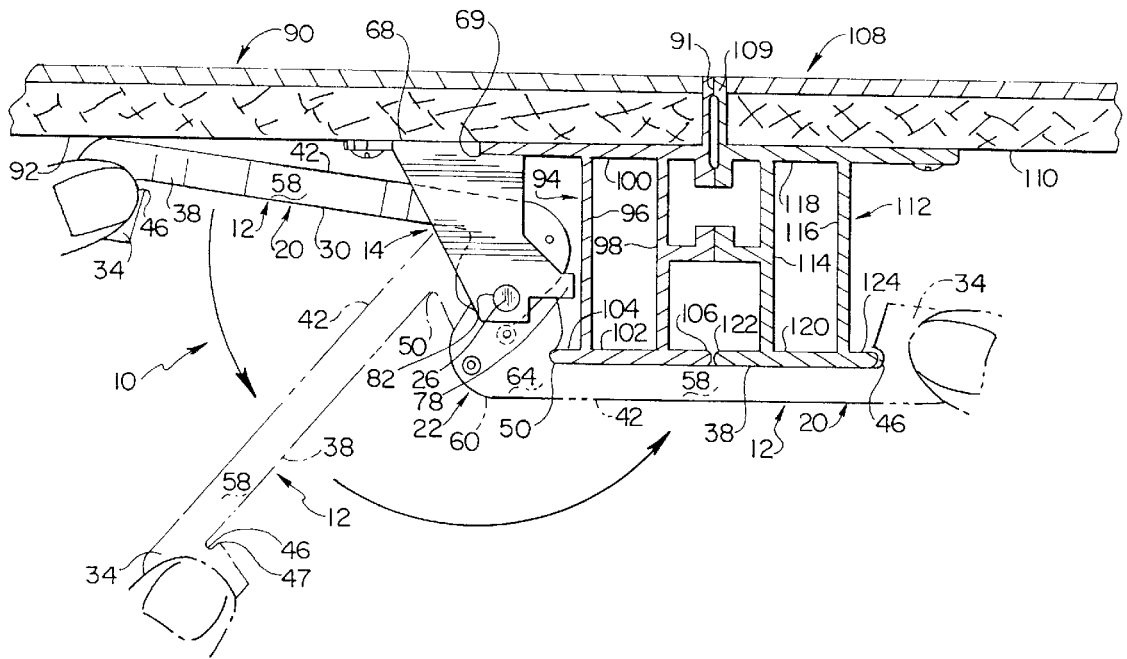
FIG. 6 is a fragmentary, elevational view of two adjacent stage panels, with the clamp assembly mounted on one of the modules and with phantom lines depicting the clamp in an intermediate and an about to be engaged position.

As depicted in FIGS. 6 and 7, clamp assembly 10 may be installed onto platform module 90 when in use. Platform module 90 includes forward edge 91, lower surface 92, and bracket 94 attached to lower surface 92. Bracket 94 includes vertical elements 96 and 98 extending between upper and lower horizontal elements 100, 102. Horizontal elements 100, 102 are preferably integral to vertical elements 96 and 98, and may advantageously comprise an aluminum extrusion. Horizontal element 100, hence bracket 94, is attached to the lower surface 92 of platform module 90. Rear flange 104 and front flange 106 extend past vertical elements 96, 98 and represent extensions of horizontal element 102.

Another platform module 108 represents another modular element to be detachably joined by the present invention. Platform module 108 includes forward surface 109, lower surface 110 and bracket 112. Bracket 112 represents a "mirror image" or complementary device to bracket 94 and includes vertical elements 114, 116 extending between upper and lower horizontal elements 118, 120. Horizontal element 118, hence bracket 112, is attached to lower surface 110 of platform module 108. Front flange 122 and rear flange 124 extend past vertical elements 114, 116 and represent extensions of horizontal element 120.

Platform modules 90, 108 are similar or identical to the modules disclosed in U.S. Pat. No. 5,205,087, assigned to the assignee of the present invention, the disclosure of which is hereby incorporated by reference.

Top plate 68 of standoff bracket assembly 14 is preferably mounted onto lower surface 92 of platform module 90 by means of a screw or bolt through circular orifice 68 of platform module 92. As depicted in FIGS. 6, 7, clamp assembly 10 has been previously mounted on lower surface 92 of platform module 90. The mounting site is situated such that the rear portion of upper horizontal element 100 abuts upper step 68 and contacts lower step 69.

The resilient portions of the present invention, or the invention in its entirety, are preferably constructed from Nylon 66, however other resilient materials known to the art are suitable as well. Spring 16 may be made of plastic or metal, but should be capable of holding clamp 12 against the lower surface of a modular platform when clamp 12 is not being used to join two modular platform sections.

In operation, clamp assembly 10 is attached to lower surface 92 of platform module 90 as described above. Step 69 receives bracket element 100, and tabs 76, 78 of mounting bracket 14 help position and align the clamp assembly 10. Referring to FIGS. 4–7, when erecting a portable stage, platform module 90 is emplaced adjacent to platform module 108 such that flanges 106, 122 are proximate and such that forward edges 91, 109 abut. Clamp 12 is rotated away from lower surface 92. Wing elements 18, 20 are then urged toward each other until inner convex surfaces 52, 54 are in contact, thereby bringing wing elements 18, 20 into a tension position and increasing the distance between midpoint 57 and rear locking slots 48, 50. This increased distance allows tabs 32, 34 to be rotated past flange 124. Clamp 12, maintained by the user in a tension position, is then further rotated until upper surfaces 36, 38 are proximate or in contact with horizontal elements 102, 120. At this point rear locking slots 48, 50 are in contact with flange 104. Wing elements 18, 20 are then released, allowing them to partially return to a relaxed position, thereby firmly engaging lip 104 at contact sites 45 and 47 within front locking slots 44, 46 and detachably joining platform modules 90, 108. It will be appreciated that, as the wing elements are urged toward each other, the convex surfaces 52, 54 are in contact with each other, providing mutual support. The mutual support so provided causes each wing element to bend into a generally linear orientation, from the rest arcuate orientation, as depicted in phantom lines in FIG. 4.

During disassembly, when platform modules 90 and 108 are to be detached from each other, wing elements 18, 20 are biased inwardly as described above and rotated away from platform brackets 94, 112. When front locking slots 44, 46 are moved down and away from lip 124, wing elements 18, 20 are then released, allowing them to return to a relaxed position. The entire clamp is then allowed to return to a storage position proximate lower surface 92 of platform module 90. Since spring 16 is torsionally biased, clamp 12 tends to remain in contact with lower surface 92 and is thereby stored in a low profile position away from bracket 94 and ready for use during subsequent modular platform assembly.

Although preferably housed within standoff bracket assembly 14, clamp 12 can be utilized apart from clamp assembly 10 when it is not desirable or necessary that a securing device be affixed to one of the modules to be joined.

Referring to FIGS. 8 and 9 and as discussed above, clamp 12 limits separation displacement of platform modules 90, 108 by employing a friction locking geometry. Separation force S acts to separate joined lower horizontal elements 102, 120, hence adjacent stage platform modules 90, 108 when the assembled stage is being used. For example, this may occur during a performance when persons are moving upon the assembled modular stage. Separation force S is countered by the outward biases of wings 18, 20 of clamp 12.

Separate tension vectors V result in each wing 18, 20 when separation forces S are applied to contact sites 45, 47. Tension vector V includes parallel component P and perpendicular component H. Parallel component P opposes and is parallel to separation force S and is the product of tension vector V and the cosine of angle A ($P=V*\cos(A)$). Perpendicular component H is perpendicular to parallel component P and to separation force S and is oriented generally along where contact sites 45, 47 contact flange 124 along line segment 59. Perpendicular component H is the product of tension vector V and the sine of angle A ($H=V*\sin(A)$). Angle A represents the divergence of force V and vector P.

As clamp 12 contacts flange 124 at contact sites 45, 47, friction forces F oppose perpendicular component H with respect to each wing 18, 20. Friction force F is the product of parallel component P and the coefficient of friction f between clamp 12 and flange 124 ($F=f*P$).

When angle A is large perpendicular component H is larger than friction force F. Wings 18, 20 will then tend to straighten as they are forced toward each other. Elements 102, 120, hence stage modules 90, 108 will tend to move apart slightly as contact sites 45 and 47 move toward longitudinal axis 27 (see FIG. 2). The inward motion of contact sites 45 and 47 decreases angle A.

As angle A becomes smaller, perpendicular component H also decreases in magnitude until perpendicular component H equals friction force F. When perpendicular component H equals friction force F, wings 18, 20 no longer slide toward each other along flange 124 and any additional separation force S will cause no additional separation between the stage units. Thus, stage modules 90, 108 are effectively locked after a small amount of displacement and will displace no further. Therefore, the magnitude that stage modules 90, 108 displace due to a given separation force S depends on the lengths of wing elements 18, 20, their resiliency and the coefficient of friction. The coefficient of friction depends mostly on the materials from which wing elements 18, 20 and elements flange 124 are made and upon the smoothness of their surfaces. The lengths between contact surfaces 44, 46 and 48, 50 should be of sufficient length to allow tabs 32, 34 to rotate past flange 124 when wing elements 18, 20 are biased together yet as short as possible so that the separation displacement of platform modules 90, 108 is minimized.

When separation force S is relaxed, the outward bias of wings 18, 20 forces stage modules 90, 108 back together, thereby closing any gaps therebetween.

While the present invention preferably has two convex wing elements, each wing element with a pair of opposed locking slots, a number of alternate embodiments may be used. These include (1) an embodiment with concave wing elements, the wing elements preferably hinged or joined at both apiece and activated by biasing the wings together, (2) a "Y" conformation, with a single engaging surface on the "stem" of the "Y" and two engaging surfaces, one near each end of the wings, and (3) an embodiment with one straight wing element, and one arcuate wing element.

Because numerous modifications may be made of this invention without departing from the spirit and scope thereof, the scope of the invention is not to be limited to the embodiments illustrated and described. Rather, the scope of the invention is to be determined by appended claims and their equivalents.

What is claimed is:

1. A fastening device adapted for clamping two generally adjacent objects in a generally fixed orientation with respect to each other, comprising:

a pair of generally arcuate, resilient clamp elements, each clamp element presenting a first and second end, and opposed convex and concave surfaces extending between said first and second ends, said clamp elements being fixedly, operably coupled together at their first ends to present a clamp base, said clamp element convex surfaces oriented in opposed, facing alignment, the second ends of said clamp elements shiftable between a rest position wherein said clamp elements present a generally V-shaped orientation, and a tension position wherein said second ends are brought along a path of travel towards each other, said clamp element second ends being biased towards said rest position, and said clamp elements having locking means for locking a plurality of adjacent and independent structures into fixed relation when said clamp elements are in said rest position, said locking means comprising at least two locking structures with one locking structure being postioned proximate one of said first ends and one locking structure being positioned proximate one of said second ends of at least one of said clamp elements.

2. The fastening device of claim 1, including a mounting bracket assembly, said bracket assembly including an attachment element adapted for fixed attachment to one of said objects, a pivot arm carried by said clamp base, and a mounting bracket operably coupled to said attachment element, said pivot arm being operably, pivotally received by said mounting bracket.

3. The fastening device of claim 2, said clamp elements shiftable between a stowed position and an extended position within said mounting bracket assembly, said fastening device further including a biasing element operably coupled to said clamp elements for biasing said clamp elements to said stowed position.

4. The fastening device of claim 1, wherein said device limits a separation displacement by using a friction locking geometry.

5. A fastening device adapted for clamping two generally adjacent objects in generally fixed orientation with respect to each other, comprising:

a first clamp element presenting a first clamp element first end and a first clamp element second end, and opposed surfaces extending between said first clamp element first and second ends;

a second, generally arcuate, resilient clamp element, said second clamp element presenting second clamp element first and second ends, and opposed convex and concave surfaces extending between said second clamp element first and second ends, said clamp elements being fixedly, operably coupled together at their first ends to present a clamp base, said second clamp element convex surface oriented in opposed, facing alignment with a surface of said first clamp element, the second ends of said clamp elements shiftable between a rest position wherein said clamp element second ends are spaced apart, and a tension position wherein said second ends are brought along a path of travel towards each other, said clamp element second ends being biased towards said tension position, and said clamp elements having locking means for locking a plurality of adjacent and independent structures into fixed relation when said clamp elements are in said rest position, said locking means comprising at least two locking structures with one locking structure being postioned proximate one of said first ends and a one locking structure being positioned proximate one of said second ends of at least one of said clamp elements.

6. The fastening device of claim 5, said first clamp element being generally arcuate and resilient, said first clamp element opposed surfaces being opposed convex and concave surfaces, said first clamp element convex surface being oriented in opposed facing alignment with the convex surface of said second clamp element.

7. A clamp adapted for clamping first and second generally adjacent objects in generally fixed orientation with respect to each other, comprising:

a first generally arcuate and resilient wing element having a first and second end, a convex surface and an opposed concave surface, said convex and said concave surfaces extending between said first and second ends of said first wing element;

a second generally arcuate and resilient wing element having a first and second end, a convex surface and an opposed concave surface, said convex and said concave surfaces extending between said first and second ends of said second wing element, said first and second wing elements being operably coupled together at their respective first ends to present a clamp apex, the first and second wing element convex surfaces oriented in a generally facing relationship;

a first engagement surface presented by said clamp apex adapted for operably, abuttingly engaging said first object; and a second engagement surface presented by the second ends of each of said first and second wing elements, said second engagement surfaces adapted for operably, abuttingly engaging said second object, said clamp shiftable between a relaxed configuration wherein a midpoint of a line segment passing through said second engagement surfaces disposed on said wing elements is a first distance from said first engagement surface, and a tension position wherein a midpoint of a line segment passing through said second engagement surfaces is a second distance from said first engagement surfaces said second distance greater than said first distance.

8. The clamp of claim 7, further comprising a standoff bracket, said clamp operably and rotatably carried by said standoff bracket, said standoff bracket adapted for mounting on one of said objects.

9. A fastening device adapted for clamping two generally adjacent objects in a generally fixed orientation with respect to each other, comprising:

a pair of generally arcuate, resilient clamp elements, each clamp element presenting a first and second end, and opposed convex and concave surfaces extending between said first and second ends,said clamp elements being fixedly, operably coupled together at their first ends to present a clamp base, said clamp element convex surfaces oriented in opposed, facing alignment, the second ends of said clamp elements shiftable between a rest position wherein said clamp elements present a generally V-shaped orientation, and a tension position wherein said second ends are brought along a path of travel towards each other, said clamp element second ends being biased towards said rest position, and each of said clamp element convex and concave surfaces being configured so that a midpoint of a line segment passing through said second ends is a first distance from said clamp base when in the rest position, the midpoint of a line segment passing through said clamp elements is a second distance from said clamp base when in the tension position, said second distance being greater than said first distance; and means for locking the clamp elements between the two generally adjacent objects in a generally fixed orientation with respect to each other so that the clamp elements are generally parallel to the closest surfaces of the adjacent objects.

10. The fastening device of claim 9, including a mounting bracket assembly, said bracket assembly including an attachment element adopted for fixed attachment to one of said objects, a pivot arm carried by said clamp base, and a mounting bracket operably coupled to said attachment element, said pivot arm being operably, pivotally received by said mounting bracket.

11. The fastening device of claim 10, said clamp elements shiftable between a stowed position and an extended position within said mounting bracket assembly, said fastening device further including a biasing element operably coupled to said clamp elements for biasing said clamp elements to said stowed position.

12. The fastening device of claim 9, wherein said device limits a separation displacement of at least one of the two objects by using a friction locking geometry.

13. A fastening device adapted for clamping two generally adjacent objects in generally fixed orientation with respect to each other, comprising:

a first clamp element presenting a first clamp element first end and a first clamp element second end, and opposed first and second surfaces extending between said first clamp element first and second ends;

a second, generally arcuate, resilient clamp element, said second clamp element presenting second clamp element first and second ends, and opposed convex and concave surfaces extending between said second clamp element first and second ends, said clamp elements being fixedly, operably coupled together at their first ends to present a clamp base, said second clamp element convex surface oriented in opposed, facing alignment with the first surface of said first clamp element, the second ends of said clamp elements shiftable between a rest position, wherein said clamp element second ends are spaced apart, and a tension position wherein said second elements are brought along a path of travel towards each other, said clamp element second ends being biased towards said rest position, each said clamp element convex and concave surface being configured so that a midpoint of a line segment passing through said second ends is a first distance from said clamp base when in the rest position, the midpoint of a line segment passing through said clamp second ends is a second distance from said clamp base when in the tension position, said second distance being greater than said first distance; and means for locking the clamp elements between the two generally adjacent objects in a generally fixed orientation with respect to each other so that the clamp elements are generally parallel to the closest surfaces of the adjacent objects.

14. The fastening device of claim 13, said first clamp element being generally arcuate and resilient, said first clamp element opposed surfaces being convex and concave surfaces, said first clamp element convex surface being oriented in opposing facing alignment with the convex surface of said second clamp element.

15. A fastening device adapted for clamping two generally adjacent objects in a generally fixed orientation with respect to each other, comprising:

a pair of generally arcuate, resilient clamp elements, each clamp element presenting a first and second end, and opposed convex and concave surfaces extending between said first and second ends, said clamp elements being fixedly, operably coupled together at their first ends to present a clamp base, said clamp element convex surfaces oriented in opposed, facing alignment, the second ends of said clamp elements shiftable between a rest position wherein said clamp elements present a generally V-shaped orientation, and a tension position wherein said second ends are brought along a path of travel towards each other, said clamp element second ends being biased towards said rest position; and a mounting bracket assembly, said bracket assembly including an attachment element adopted for fixed attachment to one of said objects, a pivot arm carried by said clamp base, and a mounting bracket operably coupled to said attachment element, said pivot arm being operably, pivotally received by said mounting bracket, said clamp elements shiftable between a stowed position and an extended position within said mounting bracket assembly, said fastening device further including a biasing element operably coupled to said clamp elements for biasing said clamp elements to said stowed position.

* * * * *

UNITED STATES PATENT AND TRADEMARK OFFICE
CERTIFICATE OF CORRECTION

PATENT NO. : 5,769,560
DATED : June 23, 1998
INVENTOR(S) : Quam

It is certified that error appears in the above-identified patent and that said Letters Patent is hereby corrected as shown below:

In the Abstract, line 16, delete "flanges" and insert --flange--.

Column 6, line 13, delete "apiece" and insert --apices--.

Column 7, line 26, delete "a".

Column 7, line 66, after "surfaces" insert --,--.

Column 8, line 11, after "ends," add a space.

Signed and Sealed this

First Day of December, 1998

Attest:

BRUCE LEHMAN

Attesting Officer

Commissioner of Patents and Trademarks